United States Patent [19]
Clarke

[11] Patent Number: 5,612,797
[45] Date of Patent: Mar. 18, 1997

[54] LIQUID CRYSTAL PROJECTION DISPLAY SYSTEMS

[75] Inventor: John A. Clarke, Carshalton, England

[73] Assignee: U.S. Philips Corporation, New York, N.Y.

[21] Appl. No.: 439,318

[22] Filed: May 11, 1995

[30]    Foreign Application Priority Data

May 14, 1994 [GB]  United Kingdom .................... 9409707

[51] Int. Cl.$^6$ .............................................................. G02F 1/1335
[52] U.S. Cl. ........................................................ 349/5; 349/7
[58] Field of Search ...................................... 359/40, 41, 42

[56]              References Cited

U.S. PATENT DOCUMENTS

| | | | |
|---|---|---|---|
| 4,043,638 | 8/1977 | Kaufmann | 359/40 |
| 4,824,214 | 4/1989 | Ledebuhr | 359/40 |
| 5,299,037 | 3/1994 | Sakata | 359/41 |
| 5,437,417 | 8/1995 | Kakamura et al. | 359/40 |
| 5,442,413 | 8/1995 | Tejima et al. | 353/69 |
| 5,493,351 | 2/1996 | Hamagishi et al. | 359/40 |
| 5,537,171 | 7/1996 | Ogino et al. | 359/40 |
| 5,546,202 | 8/1996 | Ansley | 359/41 |

FOREIGN PATENT DOCUMENTS

| | | |
|---|---|---|
| 343780 | 2/1991 | Japan . |
| 375617 | 3/1991 | Japan . |
| 3259131 | 11/1991 | Japan . |
| 480710 | 3/1992 | Japan . |

*Primary Examiner*—William L. Sikes
*Assistant Examiner*—Tiep H. Nguyen

[57]              ABSTRACT

A liquid crystal projection display system includes a liquid crystal display panel (7) which is illuminated by light directed at a small angle (A) to its normal for display contrast enhancement. To reduce defocussing and distortion effects, the panel is tilted with the normal to its plane at an angle (B) to the axis of the projection lens smaller than the illumination angle (A) and a deflector element is disposed between the panel and the projection lens for deflecting the panel output beam so that it is directed generally parallel to the projection lens axis. The panel may be operated in a reflective mode or a transmissive mode. In the latter case, a further deflector element may be disposed adjacent the input side of the panel allowing the axis of illuminating light beam to be arranged parallel with the projection lens axis.

8 Claims, 3 Drawing Sheets

LIQUID CRYSTAL PROJECTION DISPLAY SYSTEMS

BACKGROUND OF THE INVENTION

1. Field of the Invention

This invention relates to a liquid crystal projection display system comprising at least one liquid crystal display panel for modulating light to produce a display output, means for directing light onto the display panel, a display screen, and a projection lens for projecting the display output from the display panel onto the display screen.

2. Discussion of the Related Art

Liquid crystal projection display systems are well known. A single monochrome or multi-colour display panel may be used. Alternatively, three separate display panels may be used, each illuminated with light a respective colour, usually red, green and blue, whose outputs are combined at the display screen to produce a full colour display. The light directed onto the display panel is modulated according to the transmission characteristics of individually-driven picture elements in an array which together produce the required display, for example a datagraphic display or a TV picture. The display panel may be operated in a transmissive mode, in which illuminating light passing through the panel from one side to the other is modulated, or in a reflective mode, in which illuminating light is directed onto one side and the display output is obtained from the same side.

One problem with liquid crystal display panels is that many do not give their best contrast when viewed at normal incidence, i.e. when viewed along a direction perpendicular to the plane of the panel. Better contrast is obtained when viewing a panel at around, for example, 5 to 10 degrees away from the normal (at a predetermined azimuth). Most known liquid crystal projection display systems are arranged such that the object, that is, the display panel, is perpendicular to the projection lens axis, assuming the light output from the panel is supplied directly to the projection lens without an intervening mirror or the like being employed. In some systems a mirror may be employed so as to fold the light path, for example to produce a more compact system. Even so, the direction of view is effectively the same.

It has been suggested previously that the liquid crystal panel can be inclined, that is, tilted, with respect to the main optical axis of the projection lens so as to obtain a higher contrast output. The tilting angle would typically be around 5° to 10°. In the English language abstract of Japanese Kokai 3-75617 there is described a transmissive mode projection system of the kind using three separate display panels and mirrors in which light from a common source is split into three different colour components, each of which is directed along a respective optical path between the common light source and a common projection lens onto a display panel and in which each panel is inclined with respect to the optical central axis of the optical path associated with that panel with a condenser lens being placed in each optical path immediately before the display panel. The tilting of the display panels in this way, however, introduces focusing and distortion problems in that the projected display image, although having higher contrast, will be largely out of focus, except, for example, along the line of the tilt axis, and will also suffer from keystone distortion.

In the English-language abstracts of Japanese Kokai's 3-259131 and 4-80710 there are described transmissive mode projection display systems in which light from a source is directed through a liquid crystal display panel at a small angle with respect to the normal. An optical wedge is placed adjacent the light output side of the panel to deflect the output beam from the panel such that its direction then coincides substantially with the main optical axis of the projection lens and so that the image projected on the projection screen suffers less distortion. However, in these systems the planes of the display panel and the projection screen are apparently substantially parallel to one another and consequently it can be expected that the displayed image will be largely out of focus. In the projection system described in the abstract of Kokai 4-80710, a further optical wedge is positioned adjacent the light input side of the liquid crystal panel which serves to deflect a beam of light from a light source whose optical axis is substantially parallel to the central axis of the projection lens such that the illuminating beam is incident on the liquid crystal panel at the required small angle with respect to the normal for contrast enhancement, the deflection by this further wedge being in the opposite sense to the deflection produced by the optical wedge adjacent the output side of the panel. In the English language abstract of Japanese Kokai 3-43780 there is described a transmissive mode projection system in which light from a source passes through an optical wedge before passing through a liquid crystal panel and then through another optical wedge after the liquid crystal panel. The wedge angles are in the plane that contains the normal to the liquid crystal panel and the optimum visual field angle direction, and so arranged that light passes through the liquid crystal panel at angles equally distributed on either side of the optimum visual field angle. As the planes of the liquid crystal panel and the viewing screen are apparently substantially parallel to one another, and an optical wedge is between the panel and the projection lens, it can be expected that the displayed image will be largely out of focus and distorted.

While in these known systems it might be possible to tilt the image, i.e. the screen, to bring the image back into focus, this would result in distortion of the displayed image.

Another transmissive mode liquid crystal projection system is described in the English-language abstract of Japanese Kokai 63-73782 in which an optical wedge is positioned adjacent the input side of a liquid crystal panel to deflect a beam of light from a light source such that it is incident on the panel at a small angle to the normal. A projection lens has its optical axis arranged parallel to the light beam before deflection and projects the display light output onto a screen which is disposed parallel to the panel. In this system, the centers of the screen and the panel and the central axis of the projection lens are all being shifted with respect to one another and to the central axis of the light beam from the light source. While the extent of keystone distortion may be reduced by such shifting, the system suffers from the drawback that it demands a projection lens with a significantly larger field of view than normal which would be of complex and difficult design and consequently expensive.

SUMMARY OF THE INVENTION

It is an object of the present invention to provide an improved liquid crystal projection display system which provides a good contrast display and which avoids at least to some extent the aforementioned problems.

According to the present invention there is provided a projection display system comprising at least one liquid crystal display panel for modulating light to produce a display output, means for directing an illuminating beam of light onto the panel substantially at a predetermined small angle A with respect to the normal to the plane of the panel for enhancing the contrast of the display output, and a projection lens for collecting the display output beam from the panel and projecting the beam onto a display screen, which is characterised in that the normal to plane of the liquid crystal display panel is tilted at an angle B to the projection lens axis which is less than the angle A, and in that an optical deflector element is disposed between the panel and the projection lens for deflecting the display output beam such that it travels in a direction substantially parallel to the projection lens axis.

In this system, therefore, the light input to the panel and the light output from the panel are at an angle to the panel, as in the aforementioned known systems. This angle is chosen to be close to the optimum visual field angle. On the output side of the liquid crystal panel, the direction of the output beam from the panel is made to match the axis of the projection lens partly by tilting the optical axis of the projection lens at a small angle with respect to the beam output from the panel and partly by means of an optical deflector element. The combination of the tilting of the panel and the use of the optical deflector element in this way enables the disadvantages of the known systems to be overcome to a large extent. The defocussing effect of the angle of tilt of the panel and the defocussing effect of the optical deflector element, when in suitably selected proportions, tend to cancel one another out with the result that the panel can be kept substantially in focus, thereby obtaining good resolution over the whole display picture, and with minimal keystone distortion. The invention thus overcomes the focus problems of the known systems in which either the panel is simply tilted by the required angle for improved contrast, or an optical wedge is used adjacent the, output of a panel that is arranged parallel with the screen.

Preferably, to provide optimum results, the tilt angle B of the normal to the plane of the panel with respect to the projection lens axis is between approximately 30–50% of the required total tilt angle A of the panel with respect to the illuminating beam, which, depending on the particular liquid crystal cell characteristics of the panel employed, typically will be around 5° to 10° as mentioned previously, and the remaining 70 to 50% of the required deflection of the display output beam is obtained by the optical deflector element.

The optical deflector element preferably comprises an optical wedge, although alternatively a holographic lens or other component suitable for deflecting the light could perhaps be employed. Assuming the optical deflector element comprises an optical wedge, the value of the angle B selected will depend to an extent on the refractive index of the wedge material. Thus, for example, an angle B which is 30% of the required angle A together with the appropriate refractive index for the wedge can give almost complete compensation for defocussing effects. The optical wedge is desirably placed as close to the panel as possible in order to minimise any colour effects due to the change of refractive index with wavelength where non-monochromatic light is used. A compound wedge comprising two different glasses may be used to obtain an achromatic combination.

The plane of the screen is preferably substantially orthogonal to the projection lens axis. However, the plane of the screen could be tilted slightly with respect to the projection lens with acceptable quality display images still being obtained.

In a preferred embodiment, the projection system is a transmissive mode system in which the panel operates to modulate light passing through the panel with the illuminating beam directing means being arranged on one side of the panel and directing light onto an input side of the panel, and the display output being obtained from the opposite, output, side of the panel. However, the invention is applicable also to a reflection mode projection system in which light is directed onto one side of the panel and the display output is obtained from the same side of the panel. In this case a beam splitter is positioned on the side of the deflector element remote from the panel to allow both a projection lens optical path and an illuminating beam optical path.

In the transmissive mode system, the illuminating beam directing means may comprise means for producing a beam of light directed generally parallel to the projection lens axis and a second optical deflector element, for example, again comprising an optical wedge, for directing said beam onto the panel at said predetermined small angle, the deflection by said second optical deflection element being in the opposite sense to the deflection by the first-mentioned optical deflector element. Because the main axis of the light from the light source is arranged generally parallel with the axis of the projection lens the mechanical layout of the projection system components is simplified.

Normally, polarisation layers are provided on the input and output surfaces of the liquid crystal display panel. However, one polarisation layer may instead be provided directly on the optical deflector element between the panel and the projection lens, and the other layer provided on the further deflector element of the light directing means if present, thereby minimising the number of surfaces that require anti-reflection coatings. The number of surfaces requiring an anti-reflection coating may advantageously be further reduced in the case of the projection system having a lens close to the panel, for example a so-called field lens, by combining this lens with the optical deflector element to form a fully-integrated, single piece, component. Similarly, in the case of a second optical deflector element being used adjacent the input side of the panel and the illuminating means also having a field-lens situated close to the panel, the second deflector element and this lens may also be combined.

BRIEF DESCRIPTION OF THE DRAWINGS

Embodiments of liquid crystal projection display systems in accordance with the present invention will now be described by way of example, with reference to the accompanying drawings, in which.

Figure 1:
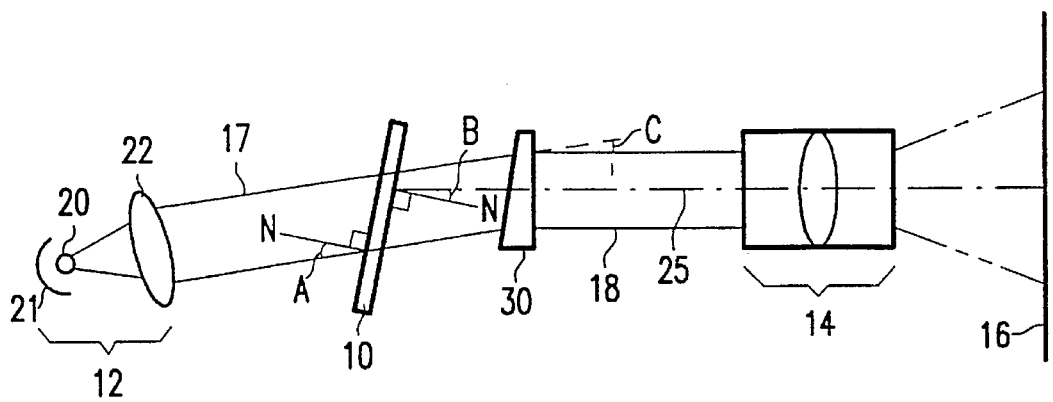
FIG. 1 shows schematically and in a simplified manner a liquid crystal display projection system according to the present invention.

It should be understood that the Figures are merely schematic and are not drawn to scale. In particular, certain dimensions such as the spacing of components, the thicknesses of components, and angles may have been exaggerated whilst other dimensions and angles may have been reduced. The same reference numerals are used throughout the Figures to indicate the same or similar parts.

DETAILED DESCRIPTION OF THE PREFERRED EMBODIMENTS

Referring to FIG. 1, the liquid crystal projection display system of this embodiment comprises a transmissive mode system which includes a liquid crystal display panel 10, illuminating means, generally referenced at 12, for directing illumination onto the input side of the panel 10, a projection lens, 14 for projecting light emanating from the output side of the panel onto a projection screen 16 where the image produced by the panel 10 is displayed. The liquid crystal display panel 10 is of conventional form, comprising two transparent plates of glass arranged spaced and parallel to one another and with a twisted nematic liquid crystal material separating the two plates. The two plates carry electrodes which define a row and column array of picture elements that are individually operable to modulate light whereby the input light beam 17 is modulated to provide a display output in accordance with video information supplied to the panel, in conventional manner.

The illuminating means 12 is arranged to direct a beam of substantially parallel light 17 onto the input side of the panel 10 and to this end may be of any suitable kind known in the art. In the example illustrated in FIG. 1, the illuminating means consists of a high intensity discharge light source 20 which, together with a reflector 21, and a collimating lens 22 produced the beam 17.

As previously explained, improved contrast is obtained when viewing the output of the panel at a small angle away from its normal, typically around 5° to 10° (at a predetermined azimuth) depending on the panel concerned and its particular cell characteristics rather than along the normal. To this end, the illuminating beam 17 is directed onto the input side of the panel 10 at a small predetermined angle A with respect to the normal N to the plane of the panel 10 in order to provide this improvement in contrast. The angle A is selected to have a value typically 5° to 10°, and possibly more depending on the characteristics of the LC panel. The normal, N, to the panel 10 is tilted slightly with respect to the projection lens' main optical axis, indicated at 25, such that its plane is at an angle B from the perpendicular to this axis which angle B is smaller in value than the angle A.

A transparent optical deflector element 30, comprising an optical wedge, is disposed between the output side of the liquid crystal panel 10 and the projection lens which deflects the display light output beam from the panel through an angle C, where C=A−B, such that the deflected beam, referenced at 18, is directed substantially parallel to the projection lens axis 25. Thus, the required illumination angle A is obtained partly by tilting the panel 10 by the angle B and partly by the optical deflector element 30. The deflected display output beam is collected by the projection lens and projected onto the screen 16 whose plane is substantially orthogonal to the projection lens axis.

The angle B by which the normal to the panel 10 is tilted relative to the projection lens axis lies between 30% and 50% of the required total tilt to the light beam for improved contrast and the remaining 70% to 50% is obtained by the deflection angle C of the transparent wedge 30. If the material of the optical wedge 30, which may be of glass or plastics, has a refractive index n, then the angle of the wedge will be approximately 1/(n−1), times the required deflection angle C.

Figure 2:
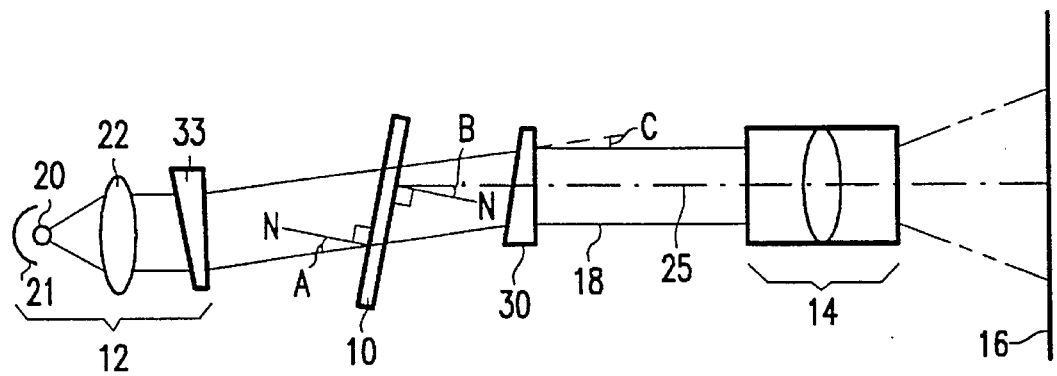
FIG. 2 shows schematically a modified form of the system of FIG. 1.

FIG. 2 illustrates a modification of the system of FIG. 1 in which a further optical deflector element 33, again comprising a transparent wedge, is included as an additional component of the illuminating means 12. This second wedge 33 is disposed adjacent the input side of the panel 10 and is oriented in the opposite sense, i.e. inverted, relative to the wedge 30 such that its deflection is in the opposite sense. The wedge 33 deflects light incident thereon by an angular amount corresponding to the wedge 30. This enables the illuminating means to be arranged with its principal axis generally parallel with, although slightly offset from, the projection lens axis, which makes the mechanical lay-out of the projection system components more convenient. The various angles A, B and C denoted in FIG. 2 correspond with those described in connection with FIG. 1.

With regard to the systems of both FIG. 1 and FIG. 2, improved contrast in the display picture is obtained by virtue of the light collected by the projection lens and projected onto the screen having passed through the liquid crystal panel at a predetermined small angle to the normal. However, unlike the known systems described previously in which a similar contrast improvement is provided either by merely tilting the panel relative to the projection lens axis or by using a wedge to deflect light directed at an angle through the panel with the panel being arranged parallel to the screen and perpendicular to the projection lens axis, the systems of FIG. 1 and FIG. 2 do not suffer from the problem of a large proportion of the projected image displayed on the screen being appreciably out of focus or from keystone distortion as found in these known systems. The systems of FIGS. 1 and 2 rely on the desired viewing angle for contrast improvement being achieved by the combination of tilting the panel together with the use of the wedge. By appropriately selecting the ratio of the tilt angle to the wedge (deflection) angle as described above, the defocussing effects of the panel tilt and the wedge deflection tend to cancel one another and it is possible to keep the panel substantially in focus and obtain good resolution over the whole picture with minimal distortion.

The position of the wedge, or wedges as the case may be, is not critical, but placing the wedge 30 on the projection side as close as possible to the output side of the liquid crystal panel 10 will minimise any colour effects due to the change of refractive index and wavelength when using white light. Alternatively, the wedge 30 may comprise a compound wedge formed of two different glasses or plastics materials to provide an achromatic combination.

The projection systems may provide a black and white display, with the array of display elements of the liquid crystal panel serving to modulate white light, or a full colour display by means of a colour micro-filter array provided in the panel in known manner. Alternatively, a full colour display can be obtained by using three such projection systems in combination, each system having a separate liquid crystal panel and operating with a respective one of the primary colours, red, green and blue with their individual projected outputs being combined on the screen. Alternatively, using conventional techniques, for example similar to those described in the aforementioned abstract from Japanese Kokai 3-75617 a single white light source may be employed and dichroic mirrors used to split this light into red, green and blue components, each of which components is directed along a respective path which includes a display panel 10 and a deflector element and are then recombined by means of a dichroic beam combiner before being collected by a common projection lens for projection onto the screen.

Rather than providing both the polarisation films needed by the liquid crystal panel on the outer surfaces of its two transparent substrates as is usual, one of the polarisation films may be placed instead directly on a surface of the wedge 30 with, in the case of the system of FIG. 1, the other remaining on the input side surface of the panel, or, in the case of the FIG. 2 system, placed on a surface of the second wedge 33. This has the advantage of reducing the number of surfaces that need anti-reflection coatings. The wedge or wedges may be placed in contact with the surface of the panel 10 with the polarising films on their outer surfaces, again reducing the number of surfaces requiring anti-reflection coatings.

Similarly, if the projection lens 14 or the illumination system 12 makes use of a lens close to the panel 10, such lenses often being referred to as field lenses, then these can also be combined with one or both of the wedges 30 and 33 as the case may be to form a single piece element. In this case, the surface of the field lens/wedge combination facing the panel preferably should be flat so that the polarisation film can be placed directly on it. The other surface can be of any desired shape, including, for example, aspheric.

In order to minimise the effects of the wedge or wedges, the tilt of the panel is desirably about an axis parallel to the longer side of the panel, assuming that the panel is of a conventional rectangular shape having, for example, a 4:3 aspect ratio. The rubbing directions of the orientation layers on the inner surfaces of the panel's substrate are chosen as appropriate to the tilt angle.

Three particular embodiments of transmissive mode liquid crystal projection display systems will now be described in more detail with reference to FIGS. 3, 4 and 5 which illustrate schematically the optical components of the systems, including the construction of the projection lens elements, together with exemplary light rays. Because of the scale involved, the screen 16 is not shown, and the illuminating means 12 has in each case been omitted from the Figure for simplicity. It should be understood, however, that the illumination means can be of the kind illustrated in either FIG. 1 or FIG. 2.

Although reference is made throughout this description to substantially parallel light, it will be appreciated that there will, in any practical system, be some angular spread to the light. This is indicated by the 3 rays from each of the points on the panel 10 shown in FIGS. 3, 4 and 5. The central one of these 3 rays indicates the general direction of the illumination and display output beams, while the ones on either side indicate the spread of the light beam. Preferably, the spread should be equal on either side of the central rays. As can be seen from FIGS. 3, 4 and 5, the angular spread of the side rays determines the size of an aperture stop, indicated at 40, in the projection lenses.

Figure 3:
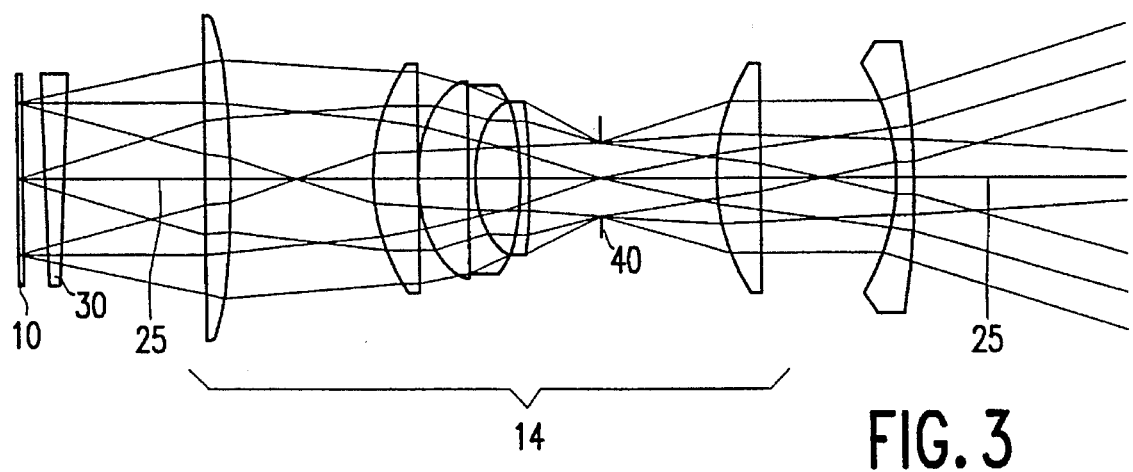
FIGS. 3 to 5 show components and ray paths of three different embodiments of transmissive mode projection systems according to the present invention.
Figure 4:
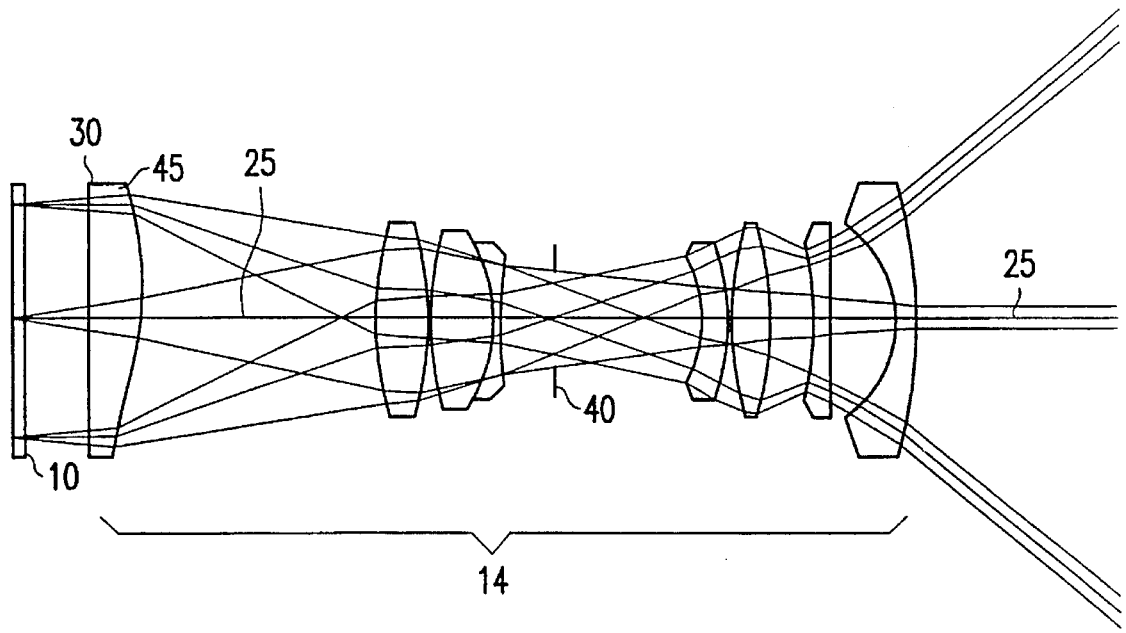
Figure 5:
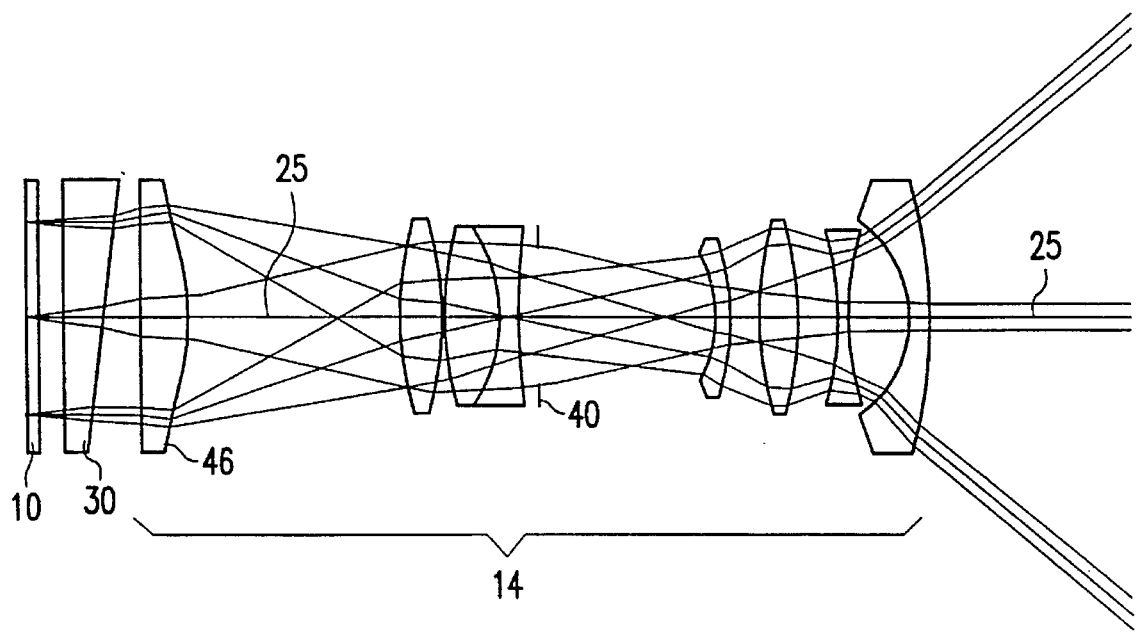

The three systems shown in FIGS. 3, 4 and 5 differ principally as regards the kind of projection lens used. In each case the projection lens 14 consists of a plurality of individual and combined lens elements and the aperture stop position 40. Relevant data for these lens elements and the panel 10 and wedge 30 components is summarised in respective Tables 1, 2 and 3 given below which detail the data values for the optical components involved according to their surfaces, in progression, these surfaces being defined in the Tables by their number order in succession from the panel 10 starting with the surface (No. 1) of the wedge 30 facing the panel 10. The surface denoted "object" is the output surface of the liquid crystal panel 10. The data under the heading "angle" denotes the angle of the perpendicular to the surface concerned with respect to the projection lens axis, i.e. the angle of tilt or inclination. In the case of the object surface, this angle is the angle B in FIGS. 1 and 2. All dimensional units are in centimeters.

Referring firstly to the system embodiment of FIG. 3, the component data is summarised in the following Table 1. The surface numbers 1 and 2 are the input and output surfaces of the wedge 30. The subsequent surface numbers 3 to 16 refer to the successive surfaces of the elements of the projection lens system. Thus the surface number 12 is the aperture stop. The surface denoted "image" is the plane of the screen 16 which is not shown in the Figure for reasons of scale.

TABLE 1

| SURFACE | RADIUS | CURVE | SEPARATION | REFRACTIVE INDEX | ANGLE (degrees) |
|---|---|---|---|---|---|
| OBJECT | PLANE | | | | 1.97 |
| 1 | PLANE | | .20000 | 1.00000 | 1.97 |
| 2 | PLANE | | .60000 | 1.53315 | −3.70 |
| 3 | PLANE | | 11.10000 | 1.00000 | |
| 4 | −18.93358 | −.0528162 | 1.72000 | 1.62038 | |
| 5 | 9.79910 | .1020502 | 9.10000 | 1.00000 | |
| 6 | PLANE | | 1.54000 | 1.62038 | |
| 7 | 5.72340 | .1747213 | .10000 | 1.00000 | |
| 8 | PLANE | | 1.70000 | 1.65856 | |
| 9 | 4.34300 | .2302556 | .46400 | 1.71665 | |
| 10 | −9.38150 | −.1065928 | 1.52000 | 1.00000 | |
| 11 | −14.40899 | −.0694011 | .75600 | 1.71665 | |
| 12 | PLANE | | 3.91233 | 1.00000 | |
| 13 | 13.73600 | .0728014 | 6.55665 | 1.00000 | |
| 14 | −180.37193 | −.0055441 | 1.30000 | 1.64769 | |
| 15 | −8.48510 | −.1178536 | 7.38500 | 1.00000 | |
| 16 | −37.67202 | −.0265449 | .68500 | 1.65238 | |
| IMAGE | PLANE | | 123.00000 | 1.00000 | |

In this system the light passes through the panel 10 at 5° to the normal, i.e. angle A equals 5°, although the panel is tilted by only 1.97° relative to the projection lens axis 25. As there is no field lens, the wedge 37 is placed on its own near the panel 10, and is orientated so that the first face is parallel to the panel 10, allowing the panel and wedge to be placed in contact if desired.

Referring to FIG. 4, the following table, Table 2, details the data for the surfaces present. The surface number 1 refers to the surface of the first optical element facing output surface of the panel 10 which element comprises the wedge 30. In this particular embodiment, the projection lens 14 has a field lens, denoted 45, positioned closely adjacent to the panel 10 and the deflector wedge 30 is combined with this field lens as a single piece element forming a decentred lens. The input surface of the wedge/field lens element is inclined by an angle (as detailed in the table) with respect to the projection lens axis 25. In this example, the surface of this optical element remote from the panel 10 is aspheric, and the values of the aspheric coefficients are given in the table. Surface number 8 refers to the aperture stop 40 of the projection lens system. As before, the surface denoted "image" refers to the plane of the screen 16 (not shown in the Figure).

The following Table, Table 3, details component data for the third system embodiment shown in FIG. 5. Surface numbers 1 and 2 are respectively the surfaces of the wedge 30 facing and remote from the panel. Surface number 10 refers to the plane of the aperture stop 40. Again, the image surface refers to the plane of the screen 16.

TABLE 2

| SURFACE | RADIUS | CURVE | SEPARATION | REFRACTIVE INDEX | ANGLE (degrees) |
|---|---|---|---|---|---|
| OBJECT | PLANE | | | | 1.13 |
| 1 | PLANE | | 1.86626 | 1.00000 | 2.99 |
| 2 | −8.33333 | −.1200000 | 1.20000 | 1.62294 | |
| Aspheric coefficients | .0009589, | .000003041 | .000001061 | .000000009091 | |
| 3 | 11.66359 | .0857369 | 14.00000 | 1.00000 | |
| 4 | −22.18539 | −.0450747 | 1.30771 | 1.62294 | |
| 5 | 10.16242 | .0984018 | .10000 | 1.00000 | |
| 6 | −5.66107 | −.1766451 | 1.89156 | 1.66161 | |
| 7 | 18.66643 | .0535721 | .40000 | 1.72328 | |
| 8 | PLANE | | 2.17668 | 1.00000 | |
| 9 | −4.53259 | −.2206246 | 6.28386 | 1.00000 | |
| 10 | −12.51552 | −.0799008 | .80000 | 1.66161 | |
| 11 | 10.40054 | .0961489 | .10000 | 1.00000 | |
| 12 | −7.33243 | −.1363804 | 1.65054 | 1.65235 | |
| 13 | −6.19755 | −.1613542 | 1.60432 | 1.00000 | |
| 14 | 120.49200 | .0082993 | .70000 | 1.66161 | |
| 15 | −4.05315 | −.2467217 | 2.24666 | 1.00000 | |
| 16 | −12.55244 | −.0796658 | .70000 | 1.66161 | |
| IMAGE | PLANE | | 83.00000 | 1.00000 | |

In this system, the light passes through the panel 10 at 3° to the normal, i.e. angle A is equal to 3°, with the panel 10 tilted by 1.13° (angle B) relative to the projection lens axis 25. As it is desirable to keep the aspheric surface of the field

TABLE 3

| SURFACE | RADIUS | CURVE | SEPARATION | REFRACTIVE INDEX | ANGLE (degrees) |
|---|---|---|---|---|---|
| OBJECT | PLANE | | | | 3.62 |
| 1 | PLANE | | .18000 | 1.00000 | 1.56 |
| 2 | PLANE | | 1.00000 | 1.65433 | −7.40 |
| 3 | PLANE | | 1.20000 | 1.00000 | |
| 4 | −6.76177 | −.1478903 | 1.50000 | 1.62294 | |
| Aspheric coefficients | .001387, | −.00003623 | .000003774, | .00000006733 | |
| 5 | 13.02358 | .0767838 | 14.00000 | 1.00000 | |
| 6 | −17.69774 | −.0565044 | 1.11510 | 1.62294 | |
| 7 | 12.96417 | .0771357 | .10000 | 1.00000 | |
| 8 | −5.59288 | −.1787989 | 1.50260 | 1.66161 | |
| 9 | 24.14876 | .0414100 | .40000 | 1.72328 | |
| 10 | PLANE | | .48580 | 1.00000 | |
| 11 | −5.98065 | −.1672058 | 7.41557 | 1.00000 | |
| 12 | −10.20236 | −.0980165 | .50000 | 1.66161 | |
| 13 | 9.85483 | .1014731 | 1.21166 | 1.00000 | |
| 14 | −10.79285 | −.0926539 | 1.69186 | 1.65235 | |
| 15 | −7.12226 | −.1404048 | 1.88252 | 1.00000 | |
| 16 | 15.11348 | .0661661 | .50000 | 1.66161 | |
| 17 | −4.50028 | −.2222083 | 2.38307 | 1.00000 | |
| 18 | −15.13306 | −.0660805 | .70000 | 1.66161 | |
| IMAGE | PLANE | | 82.00000 | 1.00000 | | lens squared on to the projection lens axis, axis, the face of the wedge 30 is not parallel to the panel 10 and is inclined at an angle of 2.99° to the projection lens axis.

In this system the light passes through the panel 10 at 10° to the normal i.e. angle A is equal to 10°, and the panel 10 is tilted by 3.62° relative to the projection lens axis. The projection lens system includes a field lens, referenced 46, but because of the large wedge angle, the wedge 30 is not incorporated into the flat side of the field lens 46. This allows the wedge orientation to be chosen so that approximately equal refraction occurs at each surface 1 and 2, in order to minimise some optical aberrations. Thus the first face is not parallel to the panel 10.

Figure 6:
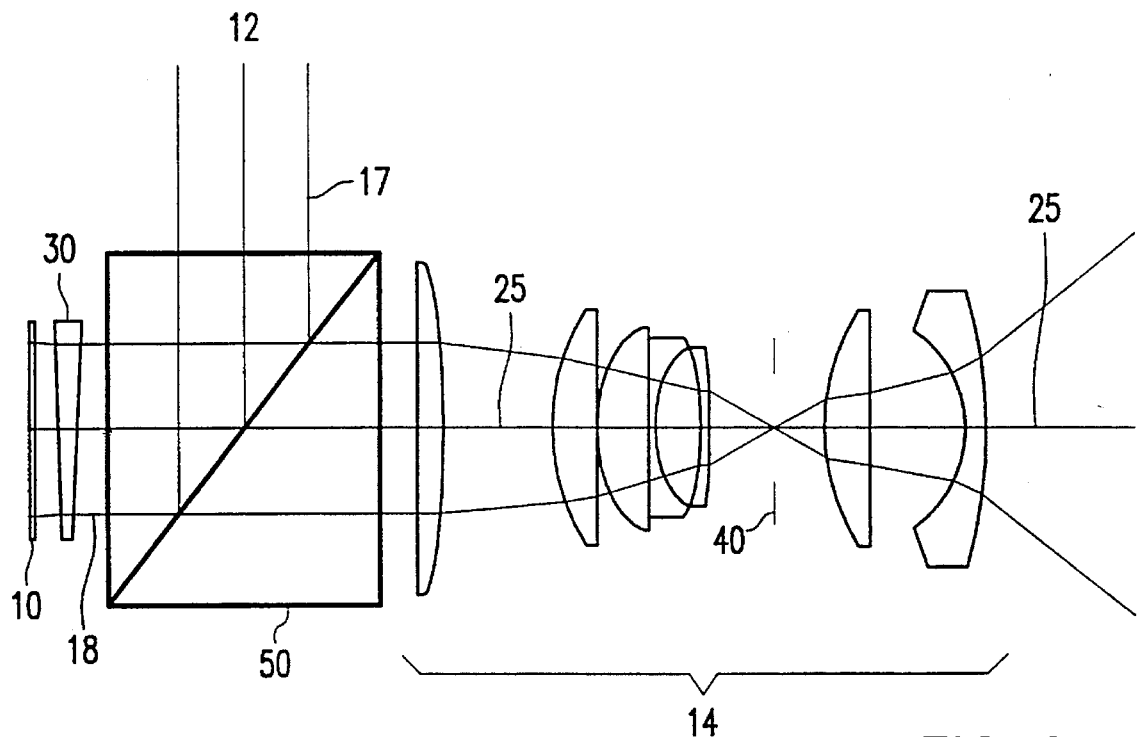
FIGS. 6 and 7 show components and ray paths in modifications of the systems of FIGS. 3 and 4 respectively which modified systems are operable in reflection mode.
Figure 7:
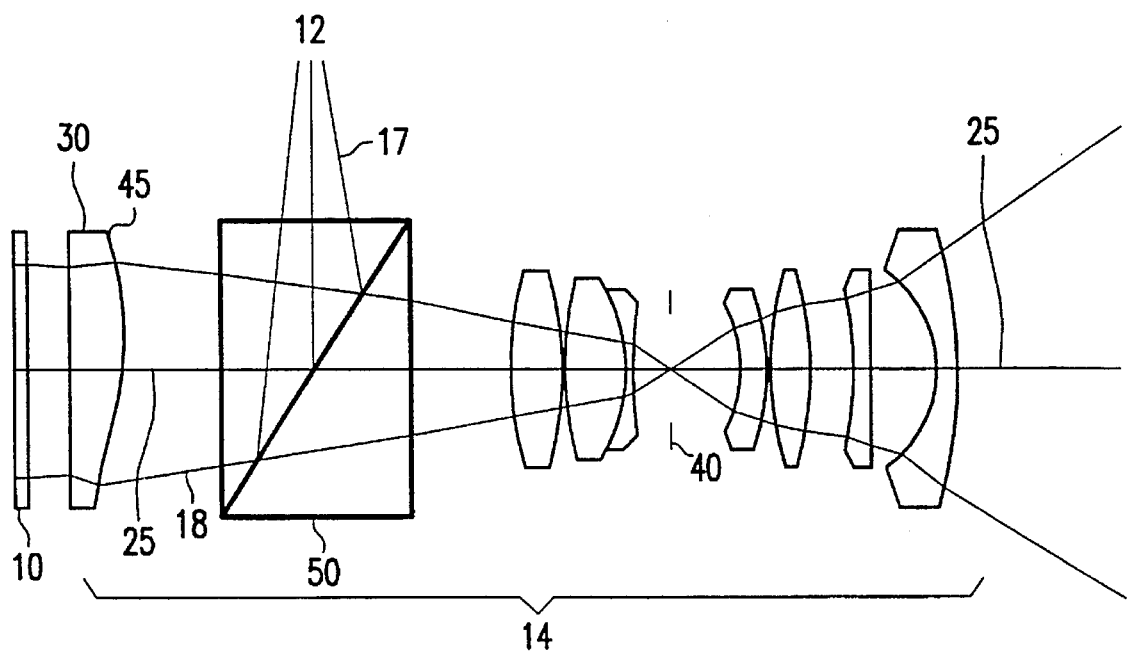

The invention can be used also in projection systems operating in a reflective mode using a reflective type LC panel. By way of example, FIGS. 6 and 7 illustrate modified forms of the projection systems of FIGS. 3 and 4 respectively for providing reflection mode operation. The same reference numerals are used to denote like components. In both embodiments, an optical beam splitter component is introduced into the system to enable light input to the display panel 10, which, of course, in this case is of the reflective rather than transmissive type, whilst allowing the modulated display light output to be directed to the projection lens and displayed as before.

Referring to FIG. 6, the beam splitter, 50, is disposed between the wedge 30 and the first lens element of the projection lens to reflect substantially parallel input light beam 17 directed from the illuminating means 12 transversely of the projection lens axis 25 towards the tilted panel 10 through the wedge 30. The reflected, modulated display light output from the panel 10 is then deflected by the wedge 30 to travel substantially parallel to the axis 25, through the beam splitter 50, to the projection lens as before. In this embodiment, therefore, the wedge 30 serves also to perform the same function as the wedge 33 in the system of FIG. 2.

In the embodiment of FIG. 7, the beam splitter 50 is positioned between the combined field lens 45 and wedge 30 and the next component of the projection lens 14. The wedge 30 again serves also to perform the same function as the wedge 33 in the FIG. 2 system as well as to deflect the reflected display output light beam from the tilted panel 10, the modulated display output being directed by the wedge 30 and field lens 45 substantially parallel to the projection lens axis 25, through the beam splitter, as before. Because in this arrangement the input light to the panel 10 passes through the field lens 45 as well as the wedge 30, the light beam 17 directed by the illuminating means 12 into the beam splitter 50 generally transverse to the axis 25 is made diverging.

In all the above described embodiments, the projection lens axis has been depicted as a continuous straight line. However, it should be understood that the lens axis can be folded, for example using mirrors so as to provide a more compact system in which case the projection lens will not be a continuous straight line.

With regard to the embodiments of both FIG. 6 and FIG. 7, it will be appreciated that the positions of the illuminating means 12 and the projection lens in relation to the beam splitter can, of course, be transposed.

In all the above described embodiments, the plane of the screen is arranged substantially orthogonal to the projection lens axis to provide best results. However, the screen can instead be arranged inclined at a small angle to the projection lens axis while still giving acceptable results. Such inclination may be desirable for front projection viewing although, of course, not necessary for rear projection viewing.

From reading the present disclosure, other modifications will be apparent to persons skilled in the art. Such modifications may involve other features which are already known in the art of liquid crystal projection display systems and which may be used instead of or in addition to features already described herein.

I claim:

1. A projection display system comprising:
   a liquid crystal display panel for modulating light to produce a display output;
   means for directing an illuminating beam of light onto said panel substantially at a predetermined small angle A with respect to a normal to the plane of said panel for enhancing a contrast of the display output; and
   a projection lens for collecting a display output beam from said panel and projecting the beam onto a display screen, wherein the normal to the plane of said liquid crystal display panel is tilted at an angle B to a projection lens axis which is less than the angle A, and wherein a first optical deflector element is disposed between said panel and said projection lens for deflecting the display output beam such that it travels in a direction substantially parallel to the projection lens axis.

2. The projection display system according to claim 1, wherein the tilt angle B of the normal to the plane of said panel with respect to the projection lens axis is between 30% to 50% of the required angle A, wherein angle A equals to a sum of the tilt angle B and a deflection angle obtained by the deflector element.

3. The projection display system according to claim 1, wherein said panel is operable in a transmissive mode with said means for directing the illuminating beam being disposed on an opposite side of said panel from said projection lens.

4. The projection display system according to claim 3, wherein said means for directing the illuminating beam comprises means for producing a beam of light which is directed generally parallel to the projection lens axis and a second deflector element which is arranged to deflect the beam in an opposite sense to the deflection by the first optical deflector element onto said panel at the angle A with respect to the normal.

5. The projection display system according to claim 1, wherein said panel is operable in a reflective mode, said means for directing an illuminating beam of light comprises a beam splitter arranged on a side of the optical deflector element remote from said panel for providing both an illuminating beam path and a projection lens path.

6. The projection display system according to claim 1, wherein the plane of the screen is substantially orthogonal to the projection lens axis.

7. The projection display system according to claim 1, wherein the optical deflector element comprises an optical wedge.

8. The projection display system according to claim 1, wherein the optical deflector element disposed between said panel and said projection lens is combined with a lens element of said projection lens thereby forming a single piece component.

\* \* \* \* \*